(12) United States Patent
Thyagarajan (10) Patent No.: US 8,190,848 B2
(45) Date of Patent: May 29, 2012

(54) INTERLEAVER MEMORY ALLOCATION METHOD AND APPARATUS

(75) Inventor: Umashankar Thyagarajan, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 953 days.

(21) Appl. No.: 12/181,010

(22) Filed: Jul. 28, 2008

(65) Prior Publication Data
US 2010/0023711 A1  Jan. 28, 2010

(51) Int. Cl.
*G06F 12/00* (2006.01)
(52) U.S. Cl. .................. 711/173; 711/E12.005
(58) Field of Classification Search .................. None
See application file for complete search history.

(56) References Cited

U.S. PATENT DOCUMENTS

| | | | |
|---|---|---|---|
| 7,269,208 B2* | 9/2007 | Mazzoni et al. | 375/219 |
| 7,865,796 B2* | 1/2011 | Irving | 714/752 |
| 2003/0021338 A1* | 1/2003 | Mazzoni et al. | 375/219 |
| 2005/0254441 A1* | 11/2005 | Levi et al. | 370/277 |
| 2006/0236045 A1* | 10/2006 | Keyes | 711/157 |
| 2007/0011559 A1* | 1/2007 | Cioffi et al. | 714/755 |
| 2008/0092027 A1* | 4/2008 | Irving | 714/796 |
| 2008/0320254 A1* | 12/2008 | Wingard et al. | 711/157 |
| 2008/0320255 A1* | 12/2008 | Wingard et al. | 711/157 |
| 2008/0320268 A1* | 12/2008 | Wingard et al. | 711/202 |
| 2008/0320476 A1* | 12/2008 | Wingard et al. | 718/101 |

OTHER PUBLICATIONS

International Telecommunication Union. "ITU-T G.993.2 (Feb. 2006). Series G: Transmission Systems and Media, Digital Systems and Networks. Digital Sections and Digital Line System—Access Networks. Very High Speed Digital Subscriber Line Transcievers 2 (VDSL2)." Feb. 2006.
Infineon Technologies. "Amazon Single Chip ADSL212+ CPE Solution. PSB 50510." Product Brief, 2004.
Ikanos Communications. "Fx 100100-5, Fx10050-5 Chipsets for DSLAMs, ONUs, OLTs, and Broadband Concentrators." Product Brief, 2007.
Conexant. "VDSL2 CO Chipset. Accelity-2." Product Brief, 2007.

* cited by examiner

*Primary Examiner* — Kevin Verbrugge
(74) *Attorney, Agent, or Firm* — Murphy, Bilak & Homiller, PLLC (57) ABSTRACT

According to one embodiment, memory is allocated between an interleaver buffer and a de-interleaver buffer in a communication device based on downstream and upstream memory requirements. The upstream de-interleaver memory requirement is determined based on upstream channel conditions obtained for a communication channel used by the communication device. The memory is allocated between the interleaver and de-interleaver buffers based on the downstream and upstream memory requirements. The downstream interleaver memory requirement may be determined based on one or more predetermined downstream configuration parameters. Alternatively, the downstream interleaver memory requirement may also be determined based on the upstream channel conditions by estimating the downstream capacity of the communication channel based on the upstream channel conditions and determining an interleaver buffer size that satisfies one or more predetermined downstream configuration parameters and the downstream capacity estimate.

24 Claims, 5 Drawing Sheets

INTERLEAVER MEMORY ALLOCATION METHOD AND APPARATUS

BACKGROUND

Interleaving is a technique used in data communication systems for protecting codewords or other data words against burst errors that occur during data transmission. Several consecutive bits of a data stream are corrupted during transmission when a burst error occurs, e.g., due to impulse noise. Error correction schemes that expect errors to be more uniformly distributed can be overwhelmed when burst errors occur. Data is often transmitted with error control bits that enable the receiver to correct a certain number of errors that occur during transmission. However, if too many errors occur within a codeword, the codeword cannot be correctly decoded despite use of an error correction scheme. To mitigate burst errors, the codeword bits are typically interleaved before being transmitted. This way, bits from the same codeword are not transmitted in consecutive order. Instead, the codewords are broken up and the bits from different codewords are consecutively transmitted. A burst error is much less likely to corrupt a codeword because the codeword bits are more uniformly distributed during data transmission. Receivers are more capable of correctly decoding transmitted codewords when interleaving is used.

Many types of data communication systems that employ interleaving are provided a fixed amount of memory to be allocated between interleaving and de-interleaving operations. For example, DSL (digital subscriber loop) modems such as VDSL (very high speed DSL) and VDSL2 modems are typically provided a total memory size (in terms of delay octets) to be allocated between a downstream interleaver buffer and an upstream de-interleaver buffer. Codewords are interleaved in the downstream direction (i.e., from a service provider or operator to a subscriber) and de-interleaved in the upstream direction (i.e., from the subscriber to the service provider or operator). The protection capability of the interleaver depends on the size of the interleaver buffer. The amount of interleaver buffer memory (interleaver depth) is typically proportional to the data rate, maximum delay and the required minimum impulse noise protection for the downstream and upstream flows.

The fixed memory is ideally allocated so that a desired noise protection capability is achieved while maintaining optimal upstream and downstream data rates. However, the optimal upstream and downstream data rates depend on actual channel conditions and interleaver memory allocation is typically performed before channel conditions are known to the modem. For example, DSL modems typical allocate memory between interleaver and de-interleaver buffers based on data rate, maximum delay and impulse noise protection configuration parameters provided to the modem as part of the MIB (management information base). These parameters represent worst-case, best-case or expected channel conditions. Therefore, the memory may not be optimally allocated between the interleaver and de-interleaver under some conditions.

SUMMARY

According to one embodiment, memory is allocated between an interleaver buffer and a de-interleaver buffer in a communication device based on downstream and upstream memory requirements. The upstream de-interleaver memory requirement is determined based on upstream channel conditions obtained for a communication channel used by the communication device. The memory is allocated between the interleaver and de-interleaver buffers based on the downstream and upstream memory requirements.

In another embodiment, memory is allocated between an interleaver buffer and a de-interleaver buffer in a communication device by determining upstream channel conditions for a communication channel used by the communication device. An upstream de-interleaver memory requirement is determined based on the upstream channel conditions and a downstream interleaver memory requirement is determined based on the upstream channel conditions. The memory is allocated between the interleaver and de-interleaver buffers based on the downstream and upstream memory requirements.

In yet another embodiment, memory is allocated between an interleaver buffer and a de-interleaver buffer in a communication device by determining upstream and downstream data rate estimates for a communication channel based on a plurality of configuration parameters obtained before the communication channel is initialized. An initial estimate of how the memory should be allocated between the interleaver and de-interleaver buffers is generated based on the upstream and downstream data rate estimates. The initial estimate of how the memory should be allocated between the interleaver and de-interleaver buffers is revised based on either upstream or downstream capacity of the channel as observed by the communication device during or after initialization of the communication channel. The memory is allocated between the interleaver and de-interleaver buffers based on the revised estimate.

In still another embodiment, a communication device includes memory configured to be allocated between an interleaver buffer and a de-interleaver buffer of the communication device. The communication device also includes a memory allocation unit. The memory allocation unit determines upstream and downstream data rate estimates for a communication channel based on a plurality of configuration parameters obtained before the communication channel is initialized. The unit also generates an initial estimate of how the memory should be allocated between the interleaver and de-interleaver buffers based on the upstream and downstream data rate estimates. The initial estimate of how the memory should be allocated between the interleaver and de-interleaver buffers is revised based on either upstream or downstream capacity of the channel as observed by the communication device during or after initialization of the communication channel. The memory allocation unit allocates the memory between the interleaver and de-interleaver buffers based on the revised estimate and which buffer is assigned a higher priority.

Those skilled in the art will recognize additional features and advantages upon reading the following detailed description, and upon viewing the accompanying drawings.

DETAILED DESCRIPTION

Figure 1:
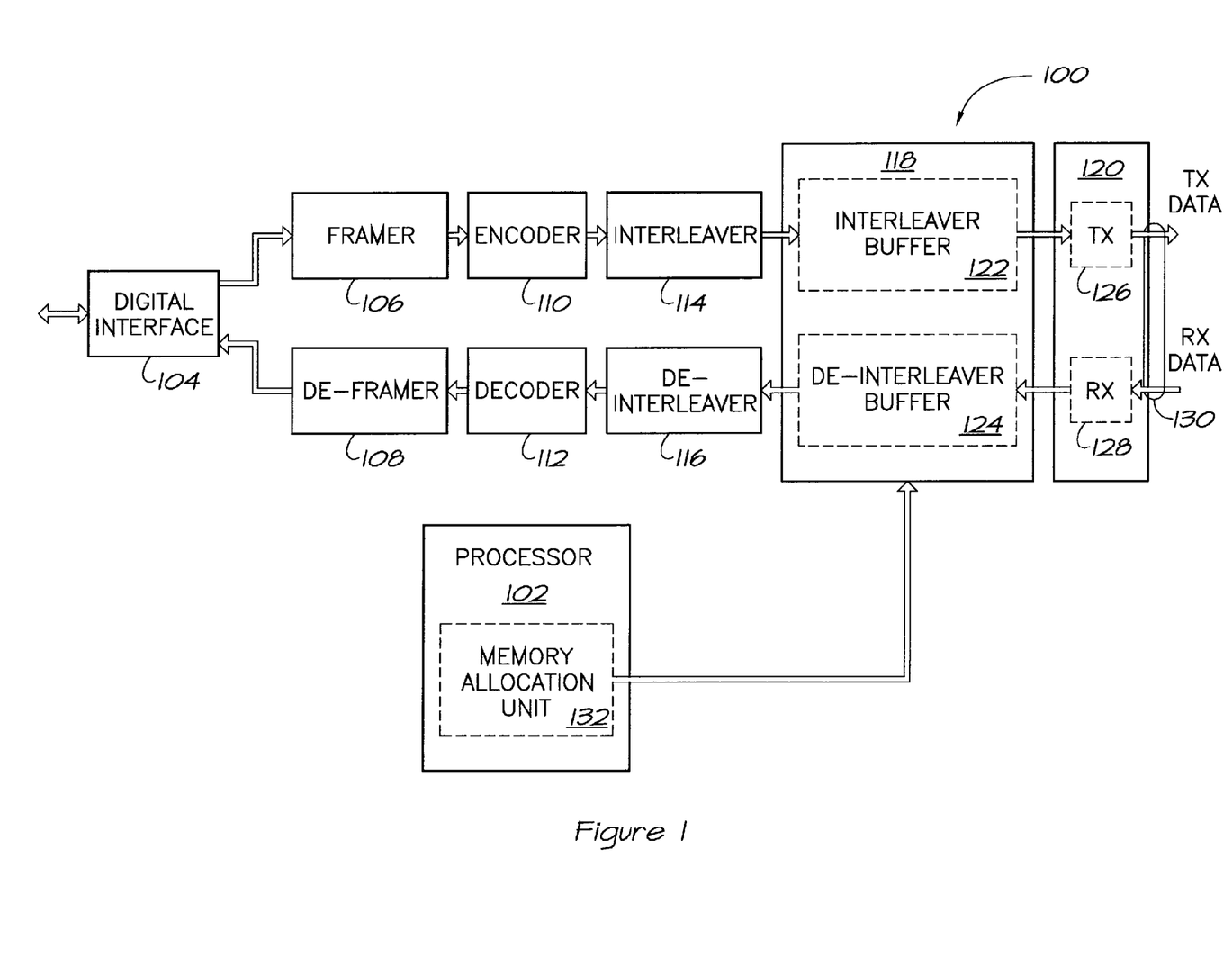
FIG. 1 is a block diagram of an embodiment of a communication device including memory allocated between interleaver and de-interleaver buffers.

FIG. 1 illustrates an embodiment of a wireless or wired communication device 100 such as a DSL or cable modem, hub or switch that transmits and receives interleaved data. The communication device 100 includes a processor 102, digital interface 104, framer/de-framer 106, 108, encoder/decoder 110, 112, interleaver/de-interleaver 114, 116, memory 118 and a front end (FE) 120. The processor 102 manages overall operation of the communication device 100. Data is transmitted from the communication device 100 to another device (not shown) via a communication channel in the downstream direction ($TX_{DATA}$) and received by the communication device 100 via a different channel in the upstream direction ($RX_{DATA}$). Data transmitted and received by the communication device 100 is interleaved to reduce the likelihood of data corruption caused by burst errors. Interleaving is implemented by logically segmenting the memory 118 into a downstream interleaver buffer 122 and an upstream de-interleaver buffer 124. Encoded data ready for transmission is interleaved as it is stored in the interleaver buffer 122. Received data is similarly de-interleaved as it is removed from the de-interleaver buffer 124. The memory 118 is allocated between the interleaver and de-interleaver buffers 122, 124 based on one or more channel conditions as observed by the communication device 100. The one or more channel conditions can be one or more upstream channel conditions or one or more downstream channel conditions or a combination of one or more upstream and one or more downstream channel conditions. This way, the memory 118 is better allocated between upstream and downstream flows even when actual channel conditions such as impulse noise levels, user interference, cross-talk, electrical and radio interference, etc. are better or worse than expected. Moreover, the memory 118 can be allocated when a new communication channel is initialized by the communication device 100. The memory 118 can also be reallocated for a preexisting channel, e.g., when upstream and/or downstream channel conditions change or when the communication device 100 returns from a low power or sleep mode.

In more detail, the digital interface 104 provides a higher-layer network interface for the communication device 100 that is compatible with a particular data link layer protocol such as Ethernet, ATM (asynchronous transfer mode), PPP (point-to-point protocol), WiFi, WiMAX, 802.11, etc. The digital interface 104 provides data received from a network node (not shown) to the framer 106 for transmission and receives data from the de-framer 108 for higher-level processing. The framer 106 multiplexes data received from the digital interface 104 into frames. The encoder 110 performs forward error correction on the frame data, e.g., in accordance with an encoding protocol such as 8B/10B, 64B/66B, etc. The interleaver 114 then interleaves the encoded frame data so that adjacent codeword bits are not transmitted in consecutive order. The encoded frame data is stored in the interleaver buffer 122 as it is being interleaved. Transmit circuitry 126 associated with the device FE 120 transmits the interleaved data downstream over a communication link 130 such as a twisted pair cable or a wireless link. On the receive side, the FE 120 includes receive circuitry 128 for processing upstream interleaved data transmitted to the communication device 100 via an upstream channel. The FE transmit and receive circuitry 126, 128 may include analog, digital and/or mixed-signal circuitry that performs functions like signal capturing, analog domain filtering, analog-to-digital and digital-to-analog conversion, filtering, power amplification, etc. Received upstream data is stored in the de-interleaver buffer 124. The de-interleaver 116 reverses the algorithm used to perform interleaving so that the encoded frame data can be properly extracted from the de-interleaver buffer 124. The de-interleaved data is then decoded by the decoder 112 to recover the frame data. Framing information is removed by the de-framer 108 and the data of interest is sent to the digital interface 104 for further processing.

Figure 2:
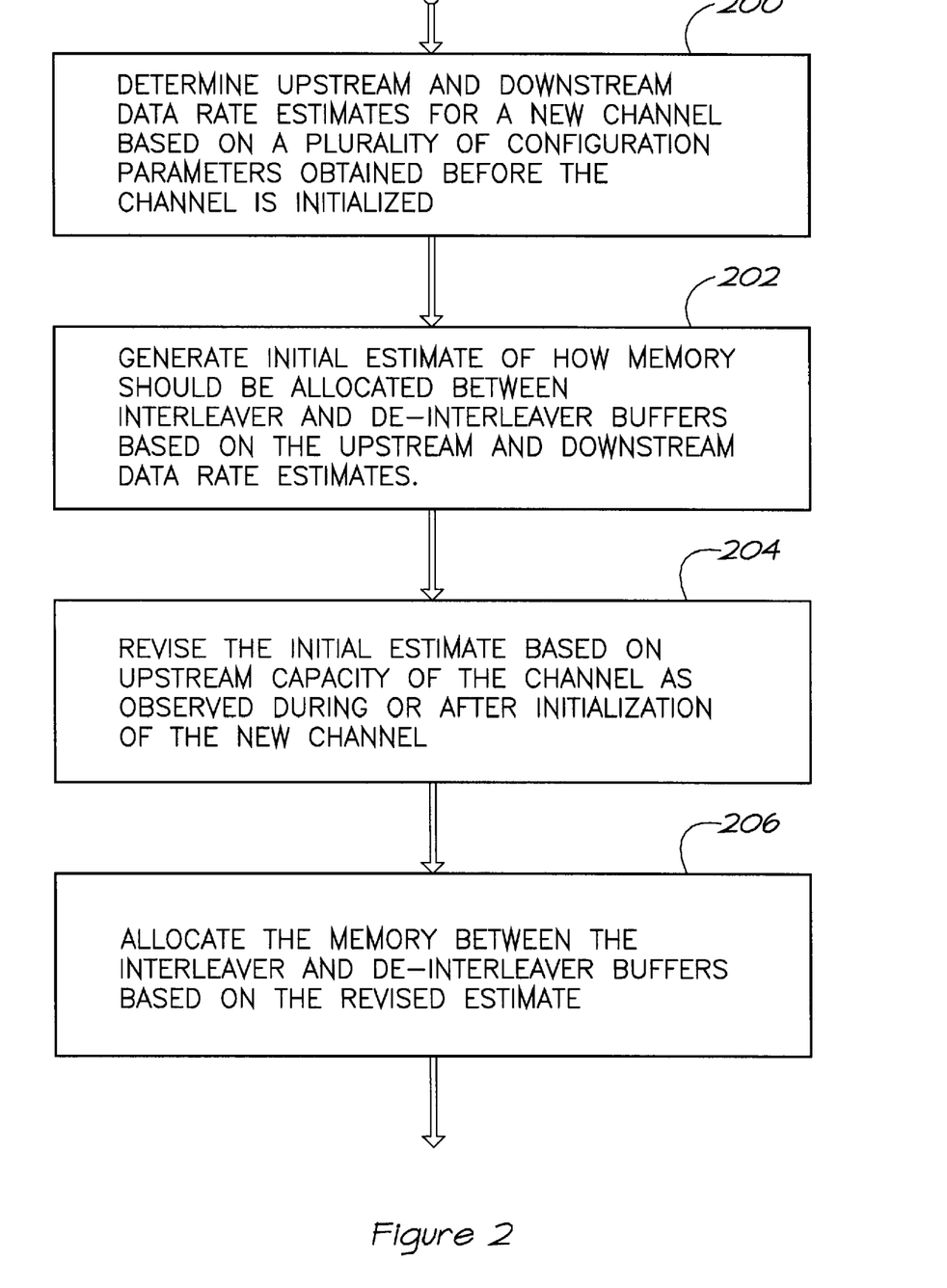
FIG. 2 is a logic flow diagram of an embodiment of processing logic for allocating memory between interleaver and de-interleaver buffers of a communication device.

The amount of memory 118 allocated between the interleaver and de-interleaver buffers 122, 124 is determined by a memory allocation unit 132 included in or associated with the processor 102 or other logic (not shown) included in the communication device 100. The memory allocation unit 132 can be implemented in hardware, firmware, software or any combination thereof. FIG. 2 illustrates an embodiment of program logic executed by the memory allocation unit 132 for allocating the memory 118 between the interleaver and de-interleaver buffers 122, 124 based on upstream channel conditions. The memory allocation unit 132 determines upstream and downstream data rate estimates for a new channel based on a plurality of configuration parameters obtained before the channel is initialized by the communication device 100 (Step 200). In one embodiment, the communication device 100 is a VDSL2 modem. According to this embodiment, the upstream and downstream data rate estimates are determined based on upstream and downstream data rate, maximum delay and impulse noise protection configuration parameters provided to the device 100 as part of the MIB as is well known in the art. These parameters do not reflect actual channel conditions, but instead represent worst-case, best-case or otherwise expected conditions.

The memory allocation unit 132 initially estimates how the memory 118 should be allocated between the interleaver and de-interleaver buffers 122, 124 based on the upstream and downstream data rate estimates (Step 202). For example, if the estimated downstream rate is higher than the upstream rate, more of the memory 118 is proportionally allocated to the interleaver buffer 122 and vice-versa. If the rates are the same, the memory 118 is equally divided between both buffers 122, 124. The memory allocation unit 132 subsequently revises the initial estimate of how the memory 118 should be allocated based on the upstream capacity or downstream capacity of the channel as observed by the communication device 100 during or after initialization of the channel (Step 204). In one embodiment, the communication device 100 estimates the upstream channel based on the impulse noise levels or other channel conditions observed by the device 100 in the upstream direction. The memory 118 is then allocated between the interleaver and de-interleaver buffers 122, 124 based on the revised memory allocation estimate (Step 206). The memory allocation estimate can be recalculated if the channel conditions change or when the communication device 100 returns from a low power or sleep mode. This way, the memory 118 can be reallocated for a preexisting channel based on the recalculated estimate. This way, the memory 118 is allocated more efficiently based on actual upstream channel conditions which may substantially depart from what is expected.

Figure 3:
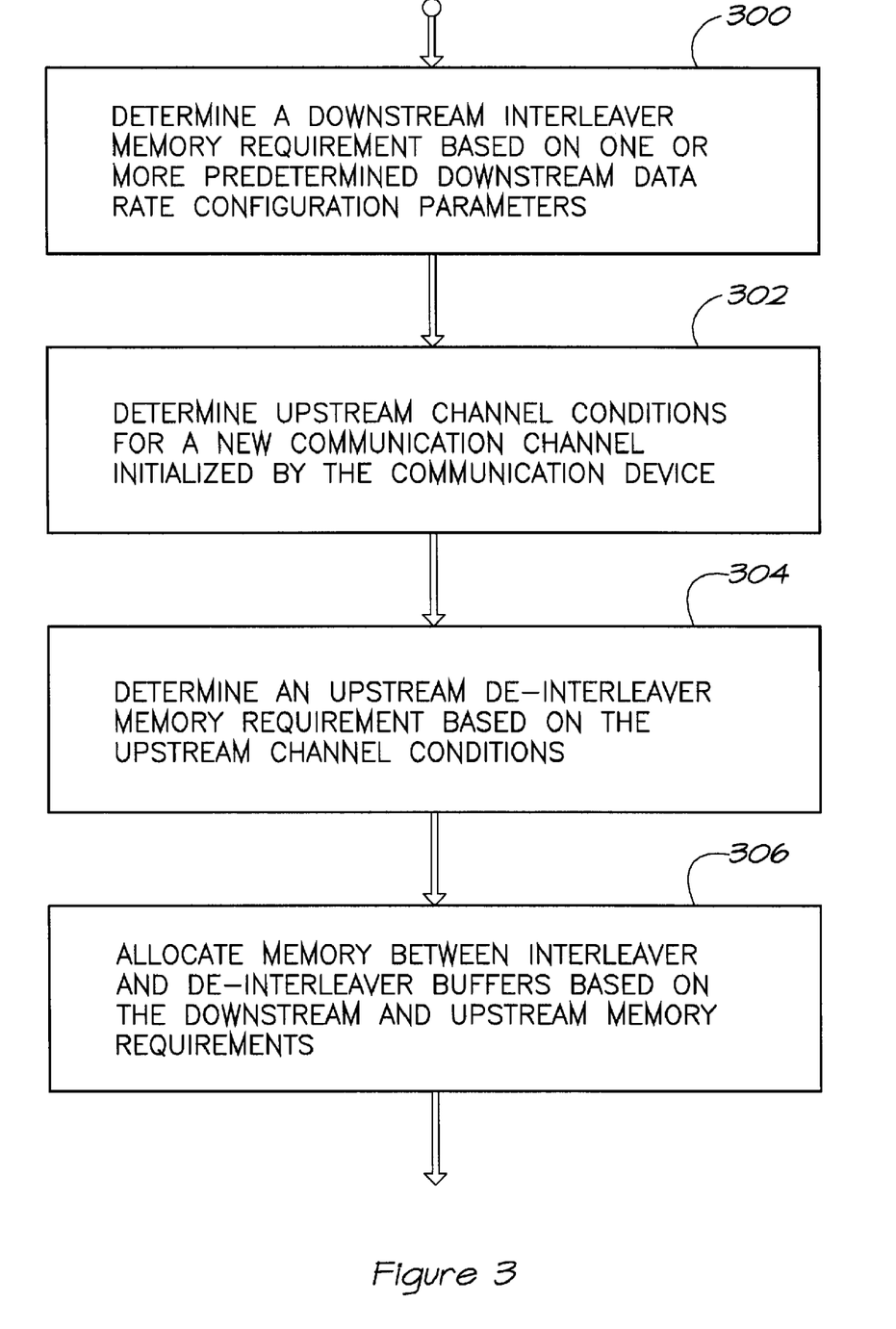
FIG. 3 is a logic flow diagram of another embodiment of processing logic for allocating memory between interleaver and de-interleaver buffers of a communication device.

FIG. 3 illustrates an embodiment of program logic executed by the memory allocation unit 132 for revising the initial estimate of how the memory 118 should be allocated based on the upstream capacity of the channel. The memory allocation unit 132 begins by determining a memory requirement for the downstream interleaver buffer 122 (Step 300). In one embodiment, the communication device 100 is a VDSL2 modem and the downstream interleaver memory requirement is computed based on downstream data rate, maximum delay and impulse noise protection configuration parameters as is well known in the art. The memory allocation unit 132 then determines the upstream channel conditions for a new communication channel initialized by the communication device 100 (Step 302). In one embodiment, the upstream channel conditions are estimated based on impulse noise levels observed by the communication device 100. A memory requirement for the upstream de-interleaver buffer 124 is determined based on the upstream channel conditions (Step 304) and the memory 118 is allocated between the interleaver and de-interleaver buffers 122, 124 based on the downstream and upstream memory requirements (Step 306). The downstream and upstream memory requirements can be revised if the channel conditions change or when the communication device 100 returns from a low power or sleep mode. This way, the memory 118 can be reallocated for a preexisting channel based on the revised requirements. Thus, the downstream memory requirement is determined using only configuration parameters while the upstream memory requirement is computed based on the actual upstream channel conditions as observed by the communication device 100.

Figure 4:
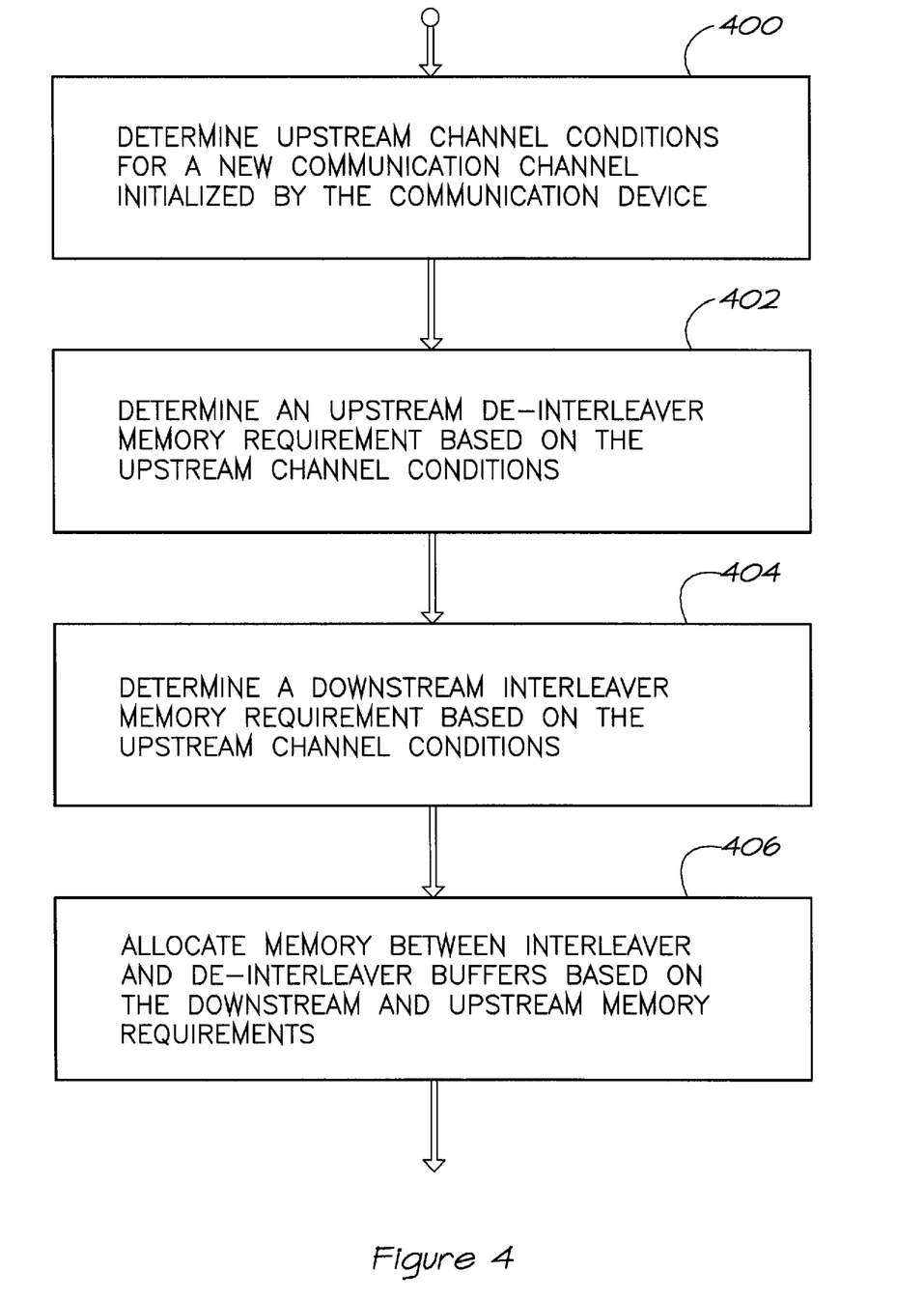
FIG. 4 is a logic flow diagram of yet another embodiment of processing logic for allocating memory between interleaver and de-interleaver buffers of a communication device.

FIG. 4 illustrates another embodiment of program logic executed by the memory allocation unit 132 for revising the initial estimate of how the memory 118 should be allocated based on the upstream capacity of the channel. According to this embodiment, both the downstream and upstream memory requirements are computed based on the upstream channel conditions. The memory allocation unit 132 begins by determining the upstream channel conditions for the communication channel initialized by the device 100 (Step 400). The memory allocation unit 132 then determines the memory requirement for the upstream de-interleaver buffer 124 based on the upstream channel conditions (Step 402). In one embodiment, the upstream de-interleaver memory requirement is determined in accordance with FIG. 3 as described above. The memory allocation unit 132 also determines the memory requirement for the downstream interleaver buffer 122 based on the upstream channel conditions (Step 404) and the memory 118 is allocated between the interleaver and de-interleaver buffers 122, 124 based on the downstream and upstream memory requirements (Step 406). The downstream and upstream memory requirements can be revised if the channel conditions change or when the communication device 100 returns from a low power or sleep mode. This way, the memory 118 can be reallocated for a preexisting channel based on the revised requirements.

In one embodiment, the memory allocation unit 132 estimates the downstream capacity of the channel based on the upstream channel conditions and determines an interleaver buffer size that satisfies the downstream capacity estimate and one or more predetermined downstream configuration parameters such as maximum expected data rate and minimum delay. Each parameter has certain criteria, e.g., a minimum and/or maximum value. In one embodiment, the buffer size is selected so that the configuration parameter criteria are satisfied. The downstream capacity of the channel can be estimated based on the upstream channel conditions by determining the ratio of a predetermined upstream data rate configuration parameter to the upstream capacity estimate and using this ratio to scale a predetermined downstream data rate configuration parameter. In one embodiment, a maximum upstream data rate configuration parameter is divided by the upstream capacity estimate. A maximum downstream data rate configuration parameter is then multiplied by the resulting quotient to compute the downstream capacity estimate.

The downstream capacity estimate can also be scaled to account for an expected difference in upstream and downstream channel conditions. That is, more or less degradation may be expected in the downstream direction than in the upstream direction. The memory allocation unit 132 can scale the downstream capacity estimate to account for this difference in expectations. Either way, the memory allocation unit 132 allocates the memory 118 between the interleaver and de-interleaver buffers 122, 124 based on the downstream and upstream memory requirements which are both computed based on the actual upstream channel conditions as observed by the communication device 100.

Figure 5:
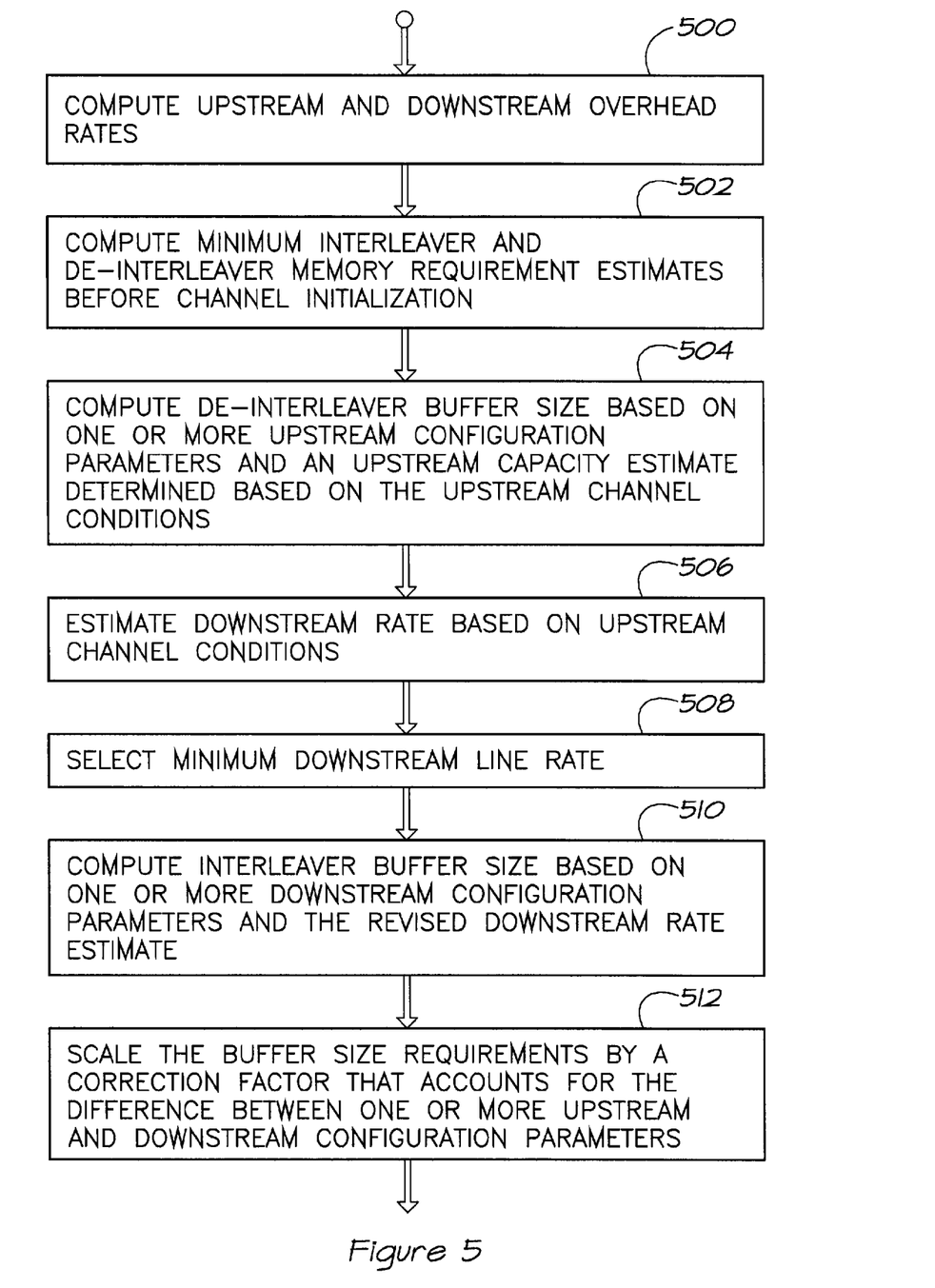
FIG. 5 is a logic flow diagram of still another embodiment of processing logic for allocating memory between interleaver and de-interleaver buffers of a communication device.

FIG. 5 illustrates yet another embodiment of program logic executed by the memory allocation unit 132 for determining the downstream and upstream memory requirements and allocating the memory 118 between the interleaver and de-interleaver buffers 122, 124 according to the requirements. The communication device 100 receives configuration parameters and stores them in the memory 118 or elsewhere. In one embodiment, the communication device 100 is a VDSL2 modem and the configuration parameters are obtained from the MIB received by the device 100. The configuration parameters include parameters for the upstream and downstream directions such as symbol rate (SYMBOL_RATE), total available memory (TOT_INT_MEM) in bytes, minimum upstream impulse noise protection (MIN_INP_US) in symbols, minimum downstream impulse noise protection (MIN_INP_DS) in symbols, maximum de-interleaving delay (MAX_DELAY_US) in ms, maximum interleaving delay (MAX_DELAY_DS) in ms, minimum upstream data rate (MIN_RATE_US) in Kbps, minimum downstream data rate (MIN_RATE_DS) in Kbps, minimum upstream overhead rate (MIN_MSG_US), minimum downstream overhead rate (MIN_MSG_DS) and the maximum interleaving depth for a given profile (DMAX_PROFILE). Several of the configuration parameters depend on the VDSL profile selected. For example, DMAX_PROFILE is derived as follows: DMAX_PROFILE=2048 octets for the 8 and 12 VDSL profiles; DMAX_PROFILE=3072 octets for the 17 VDSL profiles; and DMAX_PROFILE=4096 octets for the 30 VDSL profiles. The SYMBOL_RATE and TOT_INT_MEM configuration parameters also depend on the selected profile.

The memory allocation unit 132 retrieves various ones of the configuration parameters for use in computing the downstream and upstream memory requirements. Before a new communication channel is initialized and trained, the memory allocation unit 132 computes upstream and downstream overhead rates OH_US and OH_DS (Step 500) as given by:

$$OH\_US = [1 + (2 \times MIN\_INP\_US)/(MAX\_DELAY\_US \times SYMBOL\_RATE)]$$

$$OH\_DS = [1 + (2 \times MIN\_INP\_DS)/(MAX\_DELAY\_DS \times SYMBOL\_RATE)] \quad (1)$$

The upstream and downstream overheard rates account for the estimated coding needed in the upstream and downstream directions, respectively, to satisfy the minimum upstream and downstream INP requirements. The memory allocation unit 132 also computes minimum interleaver and de-interleaver memory requirement estimates based on the MIN_RATE_US and MIN_RATE_DS configuration parameters before channel initialization and training as is well known in the art (Step 502).

A communication channel is then initialized and trained by the communication device 100. During the channel initialization and training process, the memory allocation unit 132 determines the upstream channel conditions, e.g., based on impulse noise levels observed by the device 100. The upstream capacity of the channel can be estimated based on the upstream channel conditions. In one embodiment, the upstream channel capacity is estimated by computing the upstream line rate (US_LINE_RATE_CALC). The upstream line rate is the payload or symbol rate in the upstream direction plus the overhead rate needed to account for the observed channel noise. Additional channel capacity is needed for coding overhead when the upstream channel is relatively noisy, leaving less channel capacity for actual payload. The reverse holds true when upstream channel conditions are less noisy. The memory allocation unit 132 computes the size of the upstream de-interleaver buffer 124 that satisfies one or more predetermined upstream data rate configuration parameters and the upstream capacity estimate (Step 504).

In one embodiment, the memory allocation unit 132 computes the upstream de-interleaver buffer size by selecting the minimum upstream line rate (MIN_US_LINE_RATE) from a group including the computed upstream capacity estimate (US_LINE_RATE_CALC) as given by:

$$\text{MIN\_US\_LINE\_RATE} = \min \begin{pmatrix} \text{MAX\_CONFIG\_LINE\_RATE\_US,} \\ \text{PROVISIONED\_RATE\_US,} \\ \text{US\_LINE\_RATE\_CALC} \end{pmatrix} \quad (2)$$

MAX_CONFIG_LINE_RATE_US is a configuration parameter representing the maximum theoretical upstream line rate and PROVISIONED_RATE_US is a configuration parameter representing the maximum data capacity allocated to a user based on the upstream bandwidth being provided. The memory allocation unit 132 uses the selected minimum line rate to determine a size of the upstream de-interleaver buffer 124 that satisfies the MIN_INP_US and DMAX_PROFILE configuration parameters.

The memory allocation unit 132 also determines the downstream interleaver memory requirement by estimating a downstream capacity of the channel based on the upstream channel conditions and determining a size of the downstream interleaver buffer 122 that satisfies one or more predetermined downstream configuration parameters and the downstream capacity estimate. To this end, the memory allocation unit 132 estimates the downstream capacity of the channel by computing an estimate of the downstream line rate (Step 506) as given by:

$$\text{DS\_LINE\_RATE\_EST} = \quad (3)$$
$$\text{PROVISIONED\_RATE\_DS} \times \left( \frac{\text{US\_LINE\_RATE\_CALC}}{\text{PROVISIONED\_RATE\_US}} \right)$$

PROVISIONED_RATE_DS is a configuration parameter representing the maximum data capacity allocated to a user based on the downstream bandwidth being provided and US_LINE_RATE_CALC is the upstream channel capacity as described above. Thus, the downstream line rate estimate is scaled upward when the channel capacity is grater than the provisioned upstream line rate. To the contrary, the downstream line rate estimate is scaled downward when the channel capacity is lower than the provisioned upstream line rate (i.e., the upstream channel is relatively noisy). The memory allocation unit 132 then selects the minimum downstream line rate (Step 508) from a group of data rates including the initial downstream data rate estimate (DS_LINE_RATE_EST) as given by:

$$\text{MIN\_DS\_LINE\_RATE} = \min \begin{pmatrix} \text{MAX\_CONFIG\_LINE\_RATE\_DS,} \\ \text{PROVISIONED\_RATE\_DS,} \\ \text{DS\_LINE\_RATE\_EST} \end{pmatrix} \quad (4)$$

where MAX_CONFIG_LINE_RATE_DS is a configuration parameter representing the maximum theoretical downstream line rate. The memory allocation unit 132 uses the selected minimum downstream line rate to determine the size of the downstream de-interleaver buffer 122 which satisfies the MIN_INP_DS and DMAX_PROFILE configuration parameters (Step 510).

At this point, the size of the interleaver and de-interleaver memory buffers 122, 124 has been determined based on the actual upstream channel conditions as observed by the communication device 100. In one embodiment, the memory allocation unit 132 then scales the upstream and downstream buffer requirements as given by equations 2 and 4 using a correction factor and allocates the memory 118 based on the scaled buffer requirements (Step 512). The correction factor corresponds to the difference between one or more predetermined upstream and downstream configuration parameters. According to one embodiment, the correction factor is given by:

$$CF = \frac{(\text{MIN\_INP\_DS} \times \text{MIN\_DS\_LINE\_RATE})}{(\text{MIN\_INP\_US} \times \text{MIN\_US\_LINE\_RATE} \times \text{MAX\_DELAY\_US})} \quad (5)$$

The memory allocation unit 132 then determines whether memory allocation is to be performed in a fixed or adaptive mode. The unit 132 allocates the memory 118 between the interleaver and de-interleaver buffers 122, 124 based on the initial memory allocation estimates derived before channel initialization and training (Step 502) when operating in the fixed mode. The memory 118 is allocated in the fixed mode by determining whether the initial upstream de-interleaver memory estimate is less than the total memory allocated to the device (TOT_INT_MEM) as scaled by the correction factor (CF). If so, the size of the de-interleaver buffer 124 is set to the initial upstream de-interleaver memory estimate. Otherwise, the de-interleaver buffer size is set to TOT_INT_MEM×CF. The memory allocation unit 132 assigns the remainder of the memory 118 to the downstream interleaver buffer 122.

On the other hand, the memory allocation unit 132 uses the upstream and downstream buffer requirements calculated based on the upstream channel conditions (Steps 504 and 510) when configured in adaptive memory allocation mode. The unit 132 begins by determining whether there is enough total memory 118 to satisfy both the upstream and downstream buffer requirements. In one embodiment, the memory allocation unit 132 subtracts the downstream buffer requirement calculated in Step 510 from the total memory allocated to the device 100 (TOT_INT_MEM). If the upstream buffer requirement calculated in Step 504 is greater than the difference, enough memory is available for both buffers 122, 124 and the memory 118 can be allocated without conflict.

However, when there is not enough memory available to satisfy both buffer requirements, the memory allocation unit 132 can choose from two embodiments for allocating the memory 118. In the first embodiment, the memory allocation unit 132 determines which one of the buffers 122, 124 has a higher priority. In one embodiment, buffer priority is determined by evaluating a priority bit extracted from a configuration message received at an input of the communication device 100. If the priority bit indicates the upstream direction has priority, the memory allocation unit 132 allocates enough of the memory 118 to the upstream de-interleaver buffer 124 to satisfy the upstream buffer requirement calculated in Step 504 and the remainder of the memory 118 is allocated to the downstream interleaver buffer 122. The opposite memory allocation is performed when the priority bit indicates the downstream direction has priority. However, the buffer 122, 124 having the lower priority may not be allocated any of the memory 118 if the other buffer requires all of the memory 118.

The second embodiment for allocating the memory 118 when a conflict occurs also involves determining which one of the buffers 122, 124 has a higher priority, e.g., using the priority bit. According to the second embodiment, the memory 118 can be allocated three different ways depending on the priority and magnitude of the correction factor (CF) calculated in Step 512. When the downstream direction has priority and the CF>1, the amount of memory 118 allocated to the upstream de-interleaver buffer 124 is given by:

$$US\_INT\_MFM = \max\left(TOT\_INT\_MEM \times \left(\frac{1}{1+CF}\right), MIN\_US\_INT\_MEM\right) \quad (6)$$

where MIN_US_INT_MEM is the upstream buffer requirement calculated in Step 504. The downstream interleaver buffer 122 is then allocated the remainder of the memory 118. When the upstream direction has priority and the CF<1, the amount of memory 118 allocated to the downstream interleaver buffer 122 is given by:

$$DS\_INT\_MEM = \max(TOT\_INT\_MEM \times CF, MIN\_DS\_INT\_MEM) \quad (7)$$

where MIN_DS_INT_MEM is the downstream buffer requirement calculated in Step 510. The upstream interleaver buffer 124 is allocated the remainder of the memory 118. The third memory allocation option arises when neither of the first two conditions identified above are satisfied. Here, the total available memory 118 is split equally between the interleaver and de-interleaver buffers 122, 124.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of allocating memory between an interleaver buffer and a de-interleaver buffer in a communication device, comprising:
   determining a downstream interleaver memory requirement;
   estimating an upstream capacity of a communication channel used by the communication device, based on upstream channel conditions obtained for the communication channel;
   determining an upstream de-interleaver memory requirement based on the upstream capacity estimate; and
   allocating the memory between the interleaver and de-interleaver buffers based on the downstream and upstream memory requirements.

2. The method of claim 1, wherein determining the upstream de-interleaver memory requirement based on the upstream capacity estimate comprises:
   determining a de-interleaver buffer size that satisfies one or more predetermined upstream configuration parameters and the upstream capacity estimate.

3. The method of claim 1, wherein the downstream interleaver memory requirement is determined based on one or more predetermined downstream configuration parameters.

4. The method of claim 1, wherein determining the downstream interleaver memory requirement comprises:
   estimating a downstream capacity of the communication channel based on the upstream channel conditions; and
   determining an interleaver buffer size that satisfies one or more predetermined downstream configuration parameters and the downstream capacity estimate.

5. The method of claim 1, wherein allocating the memory between the interleaver and de-interleaver buffers based on the downstream and upstream memory requirements comprises:
   allocating a portion of the memory to the de-interleaver buffer corresponding to the upstream memory requirement; and
   allocating the remainder of the memory to the interleaver buffer.

6. The method of claim 1, wherein allocating the memory between the interleaver and de-interleaver buffers based on the downstream and upstream memory requirements comprises:
   computing a correction factor corresponding to a difference between one or more predetermined upstream and downstream configuration parameters;
   scaling the downstream and upstream memory requirements based on the correction factor; and
   allocating the memory between the interleaver and de-interleaver buffers based on the scaled downstream and upstream memory requirements.

7. The method of claim 6, wherein allocating the memory between the interleaver and de-interleaver buffers based on the scaled downstream and upstream memory requirements comprises:
   determining which one of the buffers has a higher priority;
   allocating the memory to the buffer having the highest priority based on the corresponding scaled memory requirement; and
   allocating the remainder of the memory to the buffer having the lower priority.

8. The method of claim 7, wherein determining which one of the buffers has a higher priority comprises evaluating a priority bit extracted from a configuration message received by the communication device.

9. The method of claim 1, wherein the communication channel is a new communication channel initialized by the communication device.

10. A communication device, comprising:
    memory configured to be allocated between an interleaver buffer and a de-interleaver buffer of the communication device; and
    a memory allocation unit configured to:
       determine a downstream interleaver memory requirement;

estimate an upstream capacity of a communication channel used by the communication device, based on upstream channel conditions obtained for the communication channel;

determine an upstream de-interleaver memory requirement based on the upstream capacity estimate; and allocate the memory between the interleaver and de-interleaver buffers based on the downstream and upstream memory requirements.

11. The communication device of claim 10, wherein the memory allocation unit is configured to:

determine a de-interleaver buffer size that satisfies one or more predetermined upstream configuration parameters and the upstream capacity estimate.

12. The communication device of claim 10, wherein the memory allocation unit is configured to determine the downstream interleaver memory requirement based on one or more predetermined downstream configuration parameters.

13. The communication device of claim 10, wherein the memory allocation unit is configured to:

estimate a downstream capacity of the communication channel based on the upstream channel conditions; and determine an interleaver buffer size that satisfies one or more predetermined downstream configuration parameters and the downstream capacity estimate.

14. The communication device of claim 10, wherein the memory allocation unit is configured to:

allocate a portion of the memory to the de-interleaver buffer corresponding to the upstream memory requirement; and allocate the remainder of the memory to the interleaver buffer.

15. The communication device of claim 10, the memory allocation unit is configured to:

compute a correction factor corresponding to a difference between one or more predetermined upstream and downstream configuration parameters;

scale the downstream and upstream memory requirements based on the correction factor; and allocate the memory between the interleaver and de-interleaver buffers based on the scaled downstream and upstream memory requirements.

16. The communication device of claim 15, wherein the memory allocation unit is configured to:

determine which one of the buffers has a higher priority;

allocate the memory to the buffer having the highest priority based on the corresponding scaled memory requirement; and allocate the remainder of the memory to the buffer having the lower priority.

17. The communication device of claim 16, wherein the memory allocation unit is configured to evaluate a priority bit extracted from a configuration message received by the communication device to determine which one of the buffers has a higher priority.

18. The communication device of claim 10, wherein the communication channel is a new communication channel initialized by the communication device.

19. A method of allocating memory between an interleaver buffer and a de-interleaver buffer in a communication device, comprising:

determining upstream channel conditions for a communication channel used by the communication device;

estimating a downstream capacity of the communication channel based on the upstream channel conditions;

determining an upstream de-interleaver memory requirement based on the upstream channel conditions;

determining a downstream interleaver memory requirement based on the upstream channel conditions; and allocating the memory between the interleaver and de-interleaver buffers based on the downstream and upstream memory requirements.

20. The method of claim 19, wherein estimating a downstream capacity of the communication channel based on the upstream channel conditions comprises:

determining a ratio of a predetermined upstream configuration parameter to an upstream capacity estimate; and scaling a predetermined downstream configuration parameter by the ratio.

21. The method of claim 19, further comprising scaling the downstream capacity estimate to account for an expected difference in the upstream and downstream channel conditions.

22. A method of allocating memory between an interleaver buffer and a de-interleaver buffer in a communication device, the method comprising:

determining upstream and downstream data rate estimates for a communication channel based on a plurality of configuration parameters obtained before the communication channel is initialized;

generating an initial estimate of how the memory should be allocated between the interleaver and de-interleaver buffers based on the upstream and downstream data rate estimates;

revising the initial estimate of how the memory should be allocated between the interleaver and de-interleaver buffers based on either upstream or downstream capacity of the channel as observed by the communication device during or after initialization of the communication channel; and allocating the memory between the interleaver and de-interleaver buffers based on the revised estimate.

23. A communication device, comprising:

memory configured to be allocated between an interleaver buffer and a de-interleaver buffer of the communication device; and a memory allocation unit configured to:

determine upstream and downstream data rate estimates for a communication channel based on a plurality of configuration parameters obtained before the communication channel is initialized;

generate an initial estimate of how the memory should be allocated between the interleaver and de-interleaver buffers based on the upstream and downstream data rate estimates;

revise the initial estimate of how the memory should be allocated between the interleaver and de-interleaver buffers based on either upstream or downstream capacity of the channel as observed by the communication device during or after initialization of the communication channel; and allocate the memory between the interleaver and de-interleaver buffers based on the revised estimate.

24. A communication device, comprising:

an input to receive priority information indicating that one of upstream and downstream is prioritized;

memory configured to be allocated between an interleaver buffer and a de-interleaver buffer of the communication device; and a memory allocation unit configured to:

determine upstream and downstream data rate estimates for a communication channel based on a plurality of configuration parameters obtained before the communication channel is initialized;

generate an initial estimate of how the memory should be allocated between the interleaver and de-interleaver buffers based on the upstream and downstream data rate estimates;
revise the initial estimate of how the memory should be allocated between the interleaver and de-interleaver buffers based on the priority information; and
allocate the memory between the interleaver and de-interleaver buffers based on the revised estimate.

* * * * *